(12) United States Patent
Villalobos et al.

(10) Patent No.: US 9,241,015 B1
(45) Date of Patent: Jan. 19, 2016

(54) SYSTEM AND METHOD FOR SUGGESTING DISCUSSION TOPICS IN A SOCIAL NETWORK

(71) Applicant: Google Inc., Mountain View, CA (US)

(72) Inventors: Natalie Villalobos, San Jose, CA (US); Timothy Emmet Jordan, Alameda, CA (US)

(73) Assignee: Google Inc., Mountian View, CA (US)

( * ) Notice: Subject to any disclaimer, the term of this patent is extended or adjusted under 35 U.S.C. 154(b) by 367 days.

(21) Appl. No.: 13/766,298

(22) Filed: Feb. 13, 2013

Related U.S. Application Data

(60) Provisional application No. 61/598,132, filed on Feb. 13, 2012.

(51) Int. Cl.
*H04L 12/58* (2006.01)
*H04L 29/06* (2006.01)

(52) U.S. Cl.
CPC ............ *H04L 65/403* (2013.01); *H04L 51/046* (2013.01); *H04L 51/16* (2013.01); *H04L 51/32* (2013.01)

(58) Field of Classification Search
CPC .................. H04L 51/00–51/046; H04L 65/00; H04L 65/403; H04L 67/00; H04L 67/025; H04L 67/14; H04L 67/143; H04L 67/30; H04L 67/306
USPC .................................. 709/201–202, 204–205
See application file for complete search history.

(56) References Cited

U.S. PATENT DOCUMENTS

| | | | | |
|---|---|---|---|---|
| 6,266,649 B1 * | 7/2001 | Linden et al. | ................. | 705/7.29 |
| 8,204,513 B2 * | 6/2012 | Crowley et al. | ............ | 455/456.3 |
| 8,214,254 B1 * | 7/2012 | Mowry | ........................ | 705/14.1 |
| 8,594,292 B1 * | 11/2013 | Moore et al. | ............. | 379/202.01 |
| 8,670,786 B2 * | 3/2014 | Crowley et al. | ............ | 455/456.3 |
| 8,739,037 B1 * | 5/2014 | Hoffman et al. | ............... | 715/706 |
| 2002/0116458 A1 * | 8/2002 | Bricklin et al. | ............... | 709/204 |
| 2006/0031290 A1 * | 2/2006 | Mannaru et al. | .............. | 709/204 |
| 2007/0069901 A1 * | 3/2007 | Tuck et al. | .................. | 340/573.1 |
| 2007/0116226 A1 * | 5/2007 | Bennett et al. | ........... | 379/202.01 |
| 2008/0077574 A1 * | 3/2008 | Gross | ................................ | 707/5 |
| 2008/0215607 A1 * | 9/2008 | Kaushansky et al. | ......... | 707/102 |
| 2009/0197681 A1 * | 8/2009 | Krishnamoorthy et al. | .... | 463/42 |
| 2009/0210494 A1 * | 8/2009 | Fisher et al. | ................... | 709/205 |
| 2009/0276492 A1 * | 11/2009 | Bobbitt et al. | ................ | 709/205 |

(Continued)

OTHER PUBLICATIONS

Carlson (Careful: Facebook's New Setting Publish Your Interests, Even If They're Private, businessinsider, May 3, 2010).*

*Primary Examiner* — Brian J Gillis
*Assistant Examiner* — Boris Grihalva Lobos
(74) *Attorney, Agent, or Firm* — IP Spring

(57) ABSTRACT

A system and method for suggesting discussion topics in a social network is provided. The method may include identifying a first participant associated with an online group discussion. The method may further include determining one or more interests of the first participant of the online group discussion based upon, at least in part, data associated with the first participant. The method may also include generating interface instructions based at least in part on the one or more interests of the first participant, the interface instructions usable to generate a user interface of the one or more interests for a second participant associated with the online group discussion. The method may additionally include transmitting the interface instructions to a computing device associated with the second participant.

28 Claims, 5 Drawing Sheets

(56) References Cited

U.S. PATENT DOCUMENTS

| | | | |
|---|---|---|---|
| 2011/0154224 A1* | 6/2011 | Bates et al. | 715/758 |
| 2012/0137317 A1* | 5/2012 | Elizarov et al. | 725/13 |
| 2012/0179751 A1* | 7/2012 | Ahn et al. | 709/204 |
| 2012/0254764 A1* | 10/2012 | Ayloo et al. | 715/738 |
| 2013/0162750 A1* | 6/2013 | Nerst et al. | 348/14.02 |
| 2013/0205408 A1* | 8/2013 | Yerli | 726/28 |
| 2014/0040368 A1* | 2/2014 | Janssens | 709/204 |

* cited by examiner

SYSTEM AND METHOD FOR SUGGESTING DISCUSSION TOPICS IN A SOCIAL NETWORK

RELATED APPLICATIONS

The present application claims priority to U.S. Patent Application Ser. No. 61/598,132 filed Feb. 13, 2012, which is incorporated by reference in its entirety.

TECHNICAL FIELD

This disclosure relates to social networking systems and, more particularly, to a method of suggesting discussion topics in social networking systems.

BACKGROUND

A social network (e.g., FACEBOOK™, MYSPACE™, LINKEDIN™, TWITTER™, GOOGLE+™, etc.) may refer to an online system that provides a forum for geographically separated users to interact with one another, where those users have defined a relationship between one another. Users may control who can view their information by identifying particular relationships with other users, and can also find new users from the group of other people who are "friends" of their own friends. Social networks may be aimed at different types of social interaction, such as friendship and business networking A user of a social network may have a profile page (e.g., a web page on the social network) that provides information about the user to other users of the social network. A profile may include information regarding a user's acquaintance relationships (e.g., friends, colleagues, schoolmates, etc.) on the social network.

Some social networking websites provide real-time chat capabilities (e.g. live video chat such as that available through Google+) that may enable two or more individuals to communicate in a live forum. However, there is often an awkward silence prior to the chat session if one or more of the individuals do not have appropriate discussion topics with which to begin their conversation.

SUMMARY OF DISCLOSURE

In one implementation, a method, in accordance with this disclosure, may include identifying, using the one or more computing devices, a first participant associated with an online group discussion. The method may further include determining, using the one or more computing devices, one or more interests of the first participant of the online group discussion based upon, at least in part, data associated with the first participant. The method may also include generating interface instructions based at least in part on the one or more interests of the first participant, using the one or more computing devices, the interface instructions usable to generate a user interface of the one or more interests for a second participant associated with the online group discussion. The method may additionally include transmitting, using the one or more computing devices, the interface instructions to a computing device associated with the second participant.

One or more of the following features may be included. The method may include searching for the data on a social networking page associated with the first participant. In some embodiments, the one or more interests may be configured for display in a ranked order, the ranked order being based upon, at least in part, a similarity metric between the first participant and the second participant. The method may further include receiving an indication of a selection from the second participant. In some embodiments, the online group discussion may include an internet enabled video chat. The method may also include permitting the second participant to close a portion of the user interface. In some embodiments, the data may include data available to the second participant. In some embodiments, the data may include publicly available data.

In another implementation, a computer program product residing on a computer readable storage medium having a plurality of instructions stored thereon is provided. In some embodiments, the instructions, which when executed by a processor, cause the processor to perform one or more operations. Some operations may include identifying, using the one or more computing devices, a first participant associated with an online group discussion. Operations may further include determining, using the one or more computing devices, one or more interests of the first participant of the online group discussion based upon, at least in part, data associated with the first participant. Operations may also include generating interface instructions based at least in part on the one or more interests of the first participant, using the one or more computing devices, the interface instructions usable to generate a user interface of the one or more interests for a second participant associated with the online group discussion. Operations may also include transmitting, using the one or more computing devices, the interface instructions to a computing device associated with the second participant.

One or more of the following features may be included. Operations may include searching for the data on a social networking page associated with the first participant. In some embodiments, the one or more interests may be displayed in a ranked order, the ranked order being based upon, at least in part, a similarity metric between the first participant and the second participant. Operations may further include receiving an indication of a selection from the second participant. In some embodiments, the online group discussion may include an Internet Enabled video chat. Operations may also include permitting the second participant to close a portion of the user interface. In some embodiments, the data may include data available to the second participant. In some embodiments, the data may include publicly available data.

In another implementation, a computing system is provided. In some embodiments, the computing system may include one or more processors configured to identify a first participant associated with an online group discussion, the one or more processors being further configured to determine one or more interests of the first participant of the online group discussion based upon, at least in part, data associated with the first participant. In some embodiments, the one or more processors may be further configured to generate interface instructions based at least in part on the one or more interests of the first participant, the interface instructions usable to generate a user interface of the one or more interests for a second participant associated with the online group discussion, the one or more processors being further configured to transmit the interface instructions to a computing device associated with the second participant.

One or more of the following features may be included. The one or more processors may be further configured to search for the data on a social networking page associated with the first participant. In some embodiments, the one or more interests may be configured for display in a ranked order, the ranked order being based upon, at least in part, a similarity metric between the first participant and the second participant. In some embodiments, the one or more processors may be further configured to receive an indication of a selection from the second participant. The online group discussion may include an Internet Enabled video chat. The one or more processors may be further configured to permit the second participant to close a portion of the user interface. The data may include data available to the second participant. The data may include publicly available data.

In another implementation, a method, in accordance with this disclosure, may include identifying, using the one or more computing devices, a first participant of an online video discussion. The method may further include searching, using the one or more computing devices, data associated with the first participant to determine an interest of the first participant. The method may also include providing, using the one or more computing devices, the interest of the first participant to a second participant of the online video discussion. The method may additionally include searching, using the one or more computing devices, data associated with a third participant to determine an interest of the third participant. The method may further include providing, using the one or more computing devices, the interest of the third participant to the second participant of the online video discussion.

One or more of the following features may be included. The method may include allowing at least one of the first participant, the second participant, and the third participant to remove an undesired interest from a displayed interests list. The method may also include determining an interests-similarity metric between at least two of the first participant, the second participant, and the third participant. The method may further include providing a suggested interest of discussion to at least one of the first participant, the second participant, and the third participant based upon, at least in part, the interests-similarity metric.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE EMBODIMENTS

Figure 1:
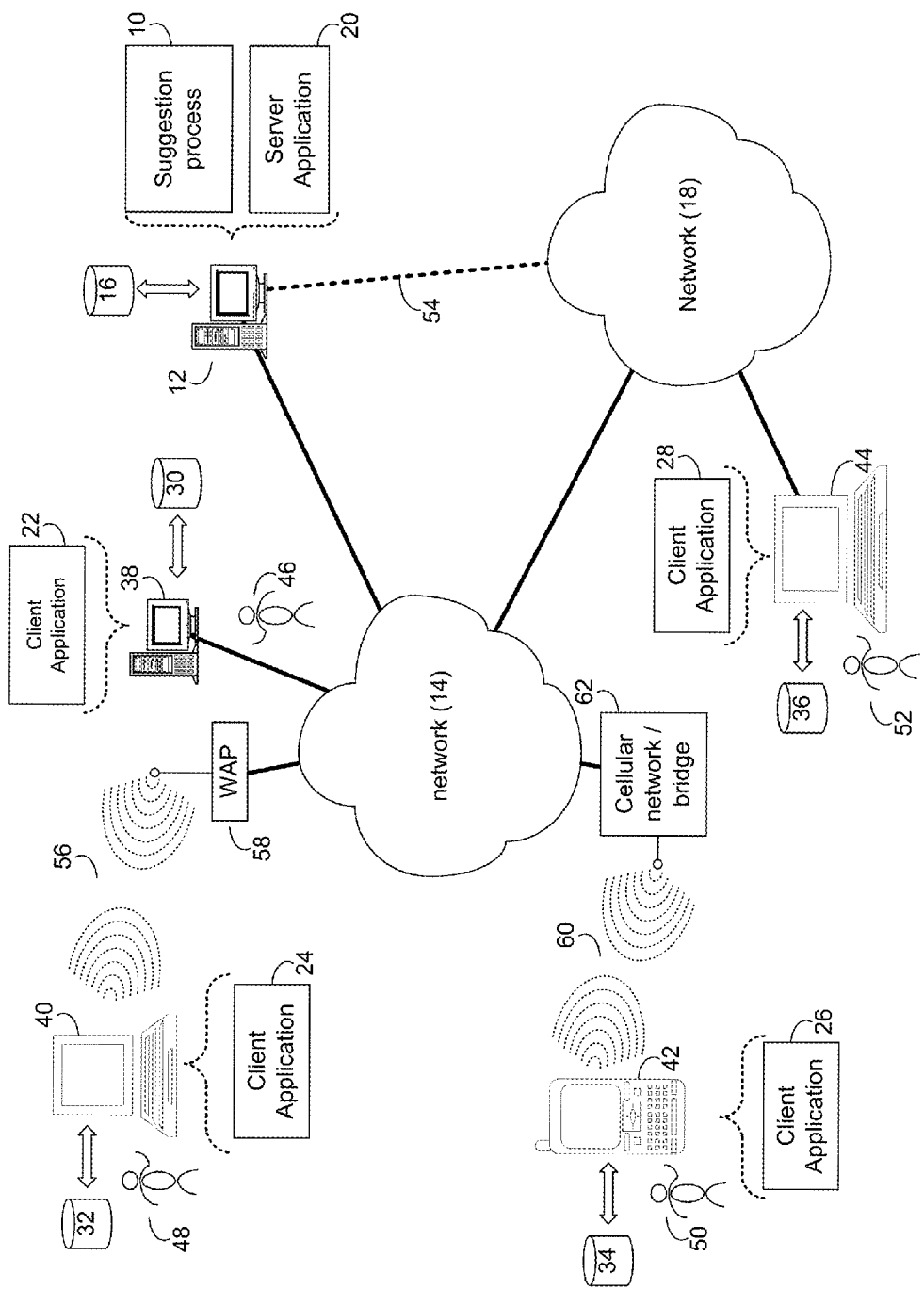
FIG. 1 is a diagrammatic view of a method for suggesting discussion topics in a social network coupled to a distributed computing network in accordance with an embodiment of the present disclosure.

Embodiments herein provide techniques for suggesting discussion topics in a social network. Some social networking websites provide real-time chat capabilities that may enable two or more individuals to communicate in a live forum. There is often an issue during real-time chat when the individuals do not know the interests of the other individuals in the forum.

For example, included within the some social networks is the ability to participate in synchronous communication sessions, which may include multiuser video chat rooms (one example may include "Hangouts" in Google+). These synchronous communication sessions may allow for virtual gatherings of people to chat about specific topics. Embodiments herein provides an improvement to a multi-user synchronous communication session, which helps individuals, who may not know the interests of each other, to identify each others interests and therefore potential topics of conversation.

Some embodiments herein may search for data pertaining to the individuals in the forum. This data may be publicly available data and/or may be data available to certain individuals in the forum. The users in the forum may, at their own choosing, opt into or out of sharing some or all of this data. In some embodiments, the data and or interests found may be provided to other individuals and displayed at their computing devices.

Example Systems:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer non-transient usable or computer readable medium may be utilized. The term "non-transient" may indicate that the computer readable medium is not a signal per se. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
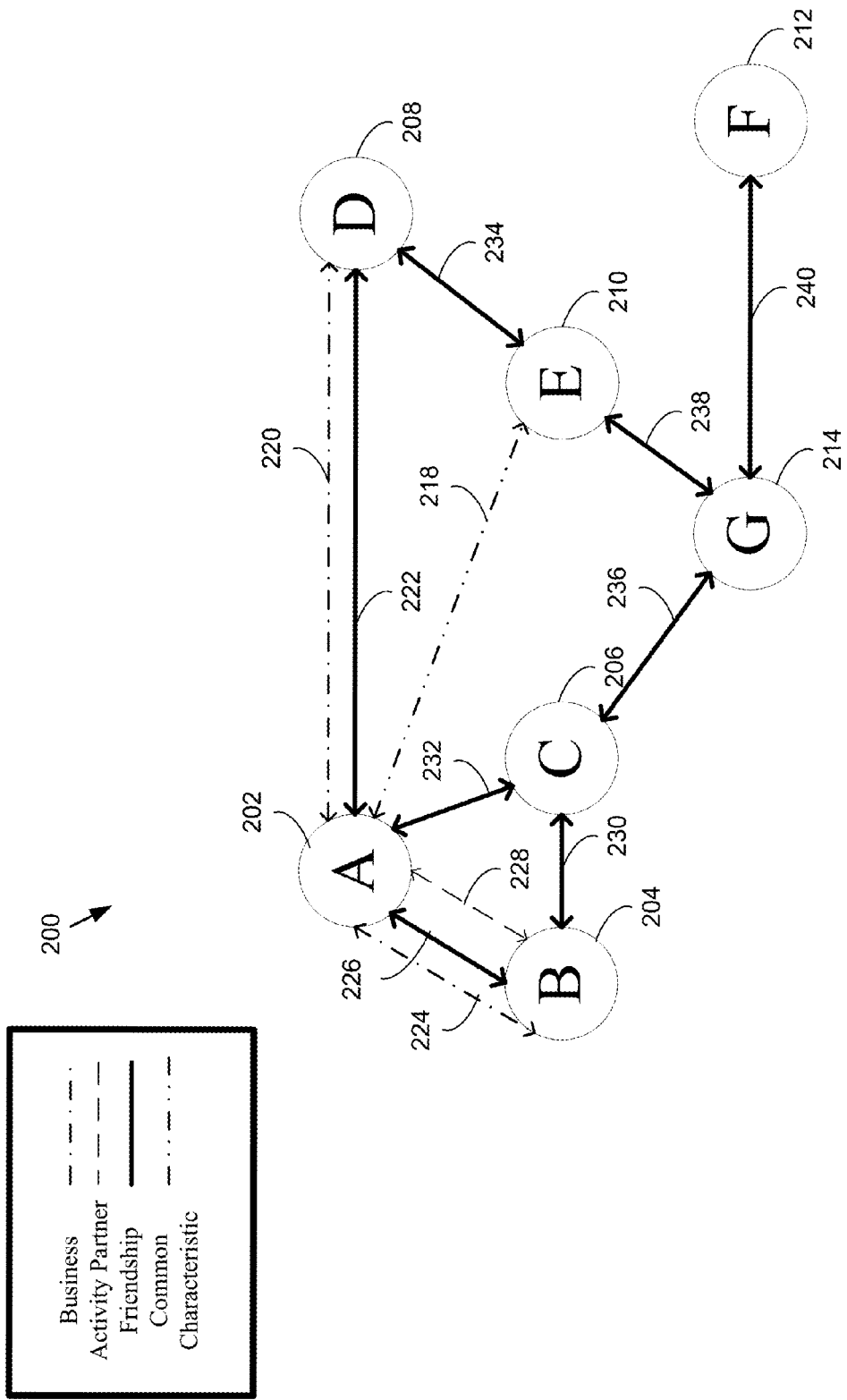
FIG. 2 is a diagram depicting a social network in accordance with an embodiment of the present disclosure.
Figure 3:
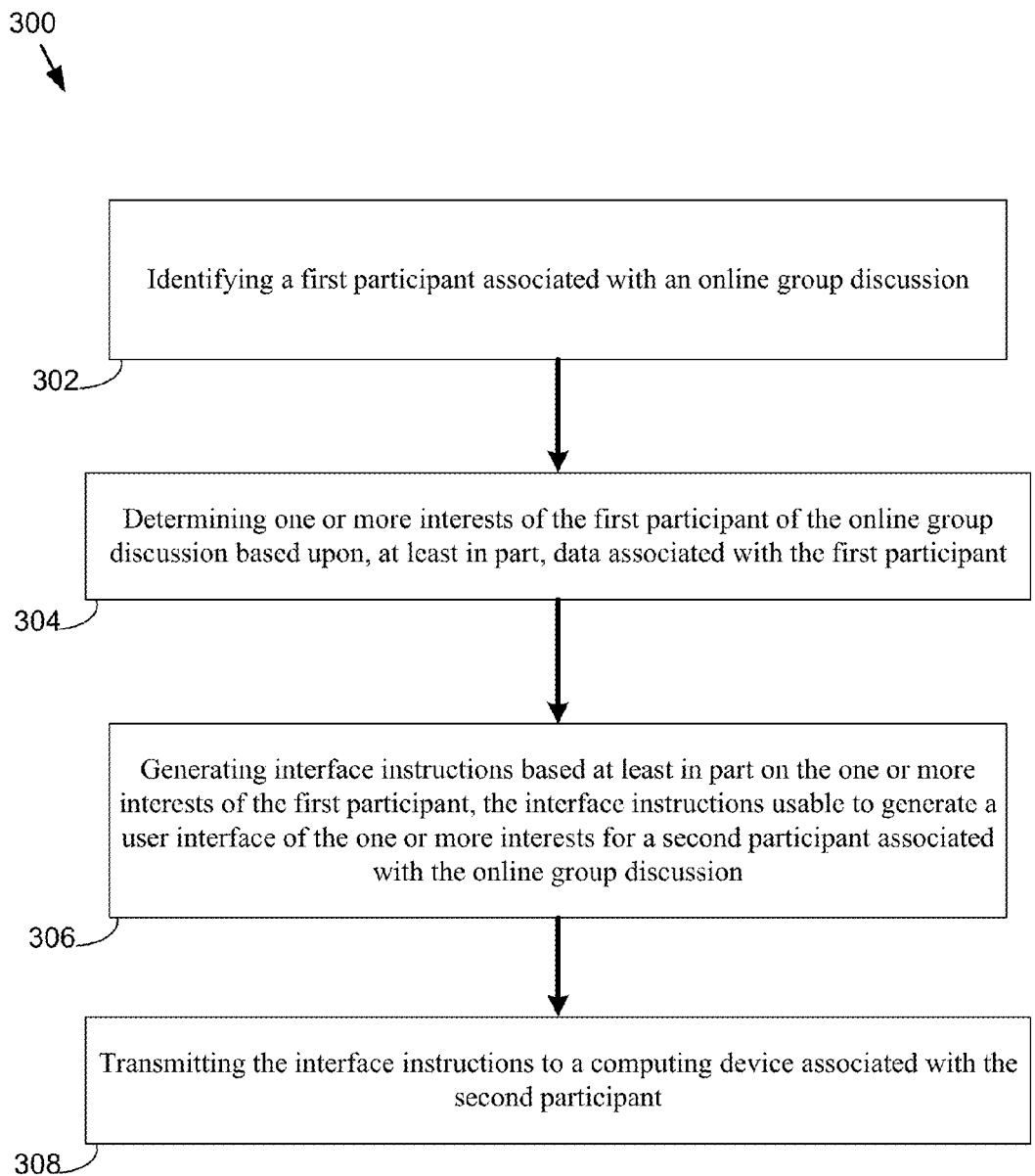
FIG. 3 is a flowchart of the method for suggesting discussion topics of FIG. 1 in accordance with an embodiment of the present disclosure.

Referring to FIGS. 1-3, there is shown a suggestion process 10 that may reside on and may be executed by computer 12, which may be connected to network 14 (e.g., the Internet or a local area network). Server application may include some or all of the elements of suggestion process 10 described herein. Examples of computer 12 may include but are not limited to a single server computer, a series of server computers, a single personal computer, a series of personal computers, a mini computer, a mainframe computer, an electronic mail server, a social network server, a text message server, a photo server, or a computing cloud. The various components of computer 12 may execute one or more operating systems, examples of which may include but are not limited to: Microsoft Windows Server™; Novell Netware™; Redhat Linux™, Unix, or a custom operating system, for example.

As will be discussed below in greater detail, suggestion process 10 may include identifying (302), using the one or more computing devices, a first participant associated with an online group discussion. The method may further include determining (304), using the one or more computing devices, one or more interests of the first participant of the online group discussion based upon, at least in part, data associated with the first participant. The method may also include generating (306) interface instructions based at least in part on the one or more interests of the first participant, using the one or more computing devices, the interface instructions usable to generate a user interface of the one or more interests for a second participant associated with the online group discussion. The method may additionally include transmitting (308), using the one or more computing devices, the interface instructions to a computing device associated with the second participant.

The instruction sets and subroutines of suggestion process 10, which may be stored on storage device 16 coupled to computer 12, may be executed by one or more processors (not shown) and one or more memory architectures (not shown) included within computer 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Suggestion process 10 may be accessed via client applications 22, 24, 26, 28. Examples of client applications 22, 24, 26, 28 may include but are not limited to a standard web browser, a customized web browser, or a custom application. The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively).

Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, smart phone 42, notebook computer 44, a server (not shown), a data-enabled, cellular telephone (not shown), and a dedicated network device (not shown).

One or more of client applications 22, 24, 26, 28 may be configured to effectuate some or all of the functionality of suggestion process 10. Accordingly, suggestion process 10 may be a purely server-side application, a purely client-side application, or a hybrid server-side/client-side application that is cooperatively executed by one or more of client applications 22, 24, 26, 28 and suggestion process 10.

Users 46, 48, 50, 52 may access computer 12 and suggestion process 10 directly through network 14 or through secondary network 18. Further, computer 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Smart phone 42 is shown wirelessly coupled to network 14 via wireless communication channel 60 established between smart phone 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and smart phones to be interconnected using a short-range wireless connection.

Client electronic devices 38, 40, 42, 44 may each execute an operating system, examples of which may include but are not limited to Apple iOS™, Microsoft Windows™, Android™, Redhat Linux™, or a custom operating system.

A number of users 46, 48, 50, and 52 of the client devices 38, 40, 42, 44, respectively, may access the server device 12 to participate in a social networking service. For example, the client devices 38, 40, 42, 44 can execute web browser applications that can be used to access the social networking service. In another example, the client devices 38, 40, 42, 44 may execute software applications that are specific to the social network (e.g., social networking "apps" running on smartphones).

The users 46, 48, 50, and 52 may participate in the social networking service provided by server device 12 by posting information, such as text comments (e.g., updates, announcements, replies), digital photos, videos, or other appropriate electronic information. In some implementations, information can be posted on a user's behalf by systems and/or services external to the social network or the server device 112. For example, the user 46 may post a review of a movie to a movie review website, and with proper permissions that website may cross-post the review to the social network on the user's 46 behalf. In another example, a software application executing on a mobile device, with proper permissions, may use global positioning system (GPS) capabilities to determine the user's location and automatically update the social network with his location (e.g., "At Home", "At Work", etc.).

Example Social Networks

Referring now to FIG. 2, a diagram of a social network 200 according to one embodiment of the present disclosure is provided. According to the embodiment illustrated in FIG. 2, the social network 200 is illustrated with a graph comprising vertices 202, 204, 206, 208, 210, 212, and 214 and edges 218, 220, 222, 224, 226, 228, 230, 232, 234, 236, 238, and 240. The vertices 202, 204, 206, 208, 210, 212, and 214 may comprise profiles A, B, C, D, E, F, and G respectively.

As used herein, the phrase "social network profile" may refer to a member profile of a member of the social network 200. According to another embodiment, one or more of the vertices can represent a community. The methods and systems discussed below are equally applicable to an embodiment where the vertices may comprise one or more communities, but for purposes of illustration, the vertices depicted in FIG. 2 represent member profiles. The example network 200 shown in FIG. 2 has seven members. Considerably more members can be part of the social network 200. A member may be an entity such as, for example, a person, an organization, a business, a corporation, a community, a fictitious person, or other suitable entity.

In some embodiments, each member profile may contain entries, and each entry may comprise information associated with a profile. For example, a person's member profile may contain: personal information, such as relationship status, birth date, age, children, ethnicity, religion, political view, sense of humor, sexual orientation, fashion preferences, smoking habits, drinking habits, pets, hometown location, passions, sports, activities, favorite books or music, TV or movie preferences, and favorite cuisines; contact information, such as email addresses, location information, instant messenger name, telephone numbers, and address; professional information, such as job title, employer, and skills; educational information, such as schools attended and degrees obtained, and any other suitable information describing, identifying, or otherwise associated with a person. A particular business member profile may, for example, contain a description of the business, and information about its market sector, customer base, location, suppliers, net profits, net worth, number of employees, stock performance, contact information, and other types of suitable information associated with the business.

A member profile may also contain rating information associated with the member. For example, the member can be rated or scored by other members of the social network 200 in specific categories, such as humor, intelligence, fashion, trustworthiness, sexiness, and coolness. A member's category ratings may be contained in the member's profile. In one embodiment of the social network, a member may have fans. Fans may be other members who have indicated that they are "fans" of the member. Rating information may also include the number of fans of a member and identifiers of the fans. Rating information may also include the rate at which a member accumulated ratings or fans and how recently the member has been rated or acquired fans.

A member profile may also contain social network activity data associated with the member. This membership information may include information about a member's login patterns to the social network, such as the frequency that the member logs in to the social network and the member's most recent login to the social network. Membership information may also include information about the rate and frequency that a member profile gains associations to other member profiles. In a social network that comprises advertising or sponsorship, a member profile may contain consumer information. Consumer information may include the frequency, patterns, types, or number of purchases the member makes, or information about which advertisers or sponsors the member has accessed, patronized, or used. Each member may be given the opportunity to opt out from providing any information that the member does not wish to share.

A member profile may comprise data stored in memory. The profile, in addition to comprising data about the member, may also comprise data relating to others. For example, a member profile may contain an identification of associations or virtual links with other member profiles. In one embodiment, a member's social network profile may comprise a hyperlink associated with another member's profile. In one such association, the other member's profile may contain a reciprocal hyperlink associated with the first member's profile. A member's profile may also contain information excerpted from another associated member's profile, such as a thumbnail image of the associated member, his or her age, marital status, and location, as well as an indication of the number of members with which the associated member is associated. In one embodiment, a member's profile may comprise a list of other social network members' profiles with which the member wishes to be associated.

In some embodiments, an association may be designated manually or automatically. For example, a member may designate associated members manually by selecting other profiles and indicating an association that may be recorded in the member's profile. According to one embodiment, associations may be established by an invitation and an acceptance of the invitation. For example, a first user may send an invitation to a second user inviting the second user to form an association with the first user. The second user may then accept or reject the invitation. According to one embodiment, if the second user rejects the invitation, a one-way association may be formed between the first user and the second user. According to another embodiment, if the second user rejects the association, no association may be formed between the two users. Also, an association between two profiles may comprise an association automatically generated in response to a predetermined number of common entries, aspects, or elements in the two members' profiles. In one embodiment, a member profile may be associated with all of the other member profiles comprising a predetermined number or percentage of common entries, such as interests, hobbies, likes, dislikes, employers and/or habits. Associations designated manually by members of the social network, or associations designated automatically based on data input by one or more members of the social network, may be referred to as user established associations.

Associations between profiles within a social network can be of a single type or can be multiple types and can include, for example, friendship associations, business associations, family associations, community associations, school associations, or any other suitable type of link between profiles. Associations may further be weighted to represent the strength of the association. For example, a friendship association can be weighted more than a school association. Each type of association can have various levels with different weights associated with each level. For example, a friendship association may be classified according to which of a plurality of friendship association levels it belongs to. In one embodiment, a friendship association may be assigned a level by the member from a list of levels comprising: a best friend, a good friend, a regular friend, an acquaintance, and a friend the member has not met.

Example Discussion Topic Suggestion Processes:

As discussed above and referring also to FIGS. 3-5, discussion topic suggestion process 10 may include identifying (302), using the one or more computing devices, a first participant associated with an online group discussion. The method may further include determining (304), using the one or more computing devices, one or more interests of the first participant of the online group discussion based upon, at least in part, data associated with the first participant. The method may also include generating (306) interface instructions based at least in part on the one or more interests of the first participant, using the one or more computing devices, the interface instructions usable to generate a user interface of the one or more interests for a second participant associated with the online group discussion. The method may additionally include transmitting (308), using the one or more computing devices, the interface instructions to a computing device associated with the second participant.

As discussed above, one or more of users 46, 48, 50, 52 may access computer 12 and discussion topic suggestion process 10 through network 14 or secondary network 18. For example, and for illustrative purposes only, assume that user 46 (i.e., the user of personal computer 38) wishes to use discussion topic suggestion process 10. User 46 may access discussion topic suggestion process 10 through client application 22 associated with personal computer 38. In this way, discussion topic suggestion process 10 may operate as a standalone application or alternatively as an applet or plug-in operating within a separate program such as server application 20. In some embodiments, server application 20 may include a social networking application such as, but not limited to, GOOGLE+, FACEBOOK, MYSPACE, LINKEDIN, TWITTER, etc. Although, this particular example focuses upon user 46 and personal computer 38 it should be noted that this disclosure is not meant to be limited to this particular example as laptop computer 40, smart phone 42, notebook computer 44, etc., may also be used to access and/or render some or all of the embodiments of discussion topic suggestion process 10 described herein.

Figure 4:
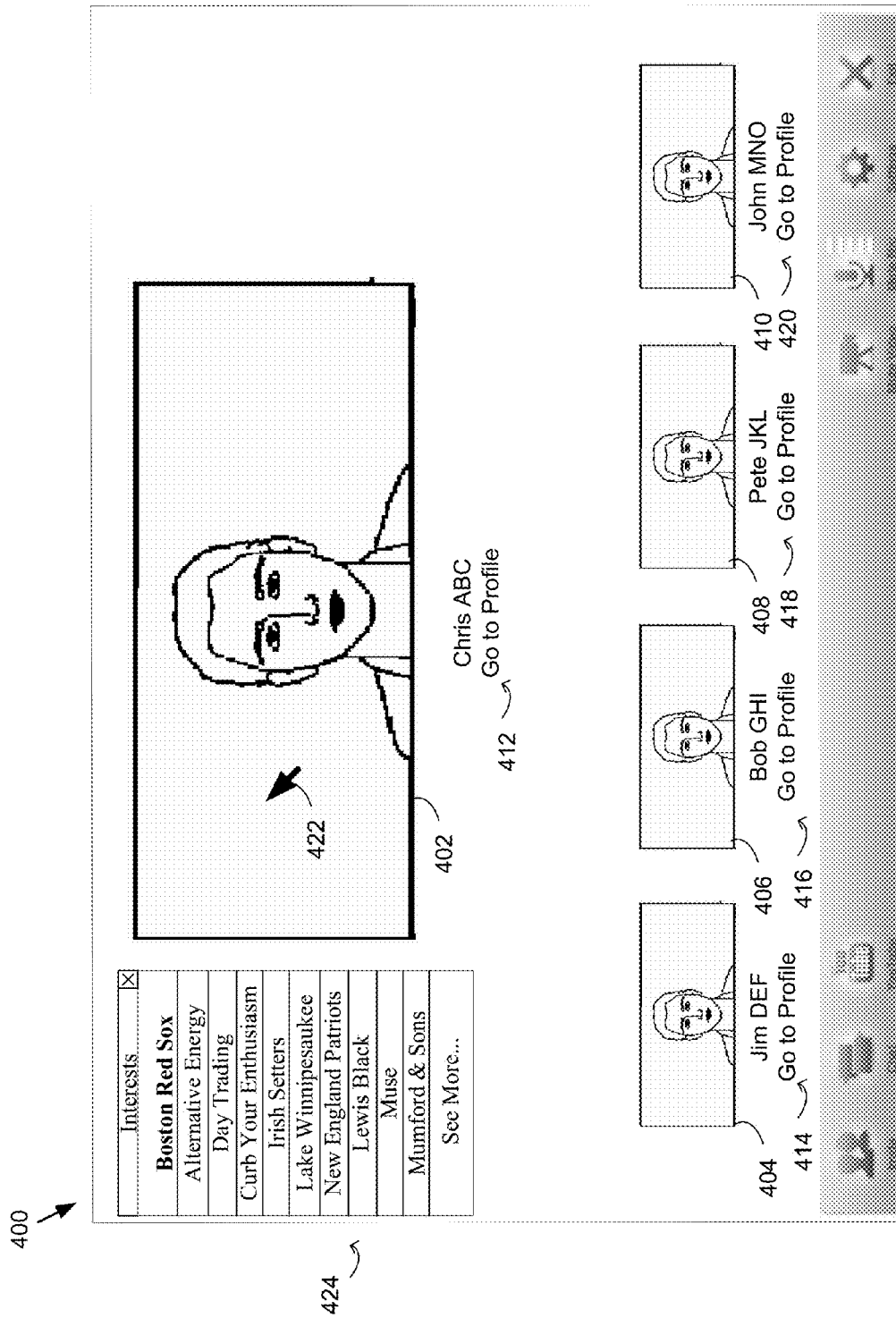
FIG. 4 is a diagrammatic view of a display portion image rendered by the method for suggesting discussion topics of FIG. 1 in accordance with an embodiment of the present disclosure.

As such, and referring now to FIG. 4, when user 46 accesses server application 20 (e.g. GOOGLE+) via client application 22 interface 400 may be rendered at personal computer 38. Interface 400 may include one or more participant display portions (e.g. 402, 404, 406, 408, 410) each of which may be configured to display a participant of an online video group discussion. For example, participant display portion 402 may display video of Chris ABC, participant display portion 404 may display video of Jim DEF, participant display portion 406 may display video of Bob GHI, participant display portion 408 may display video of Pete JKL, and participant display portion 410 may display video of John MNO. In some embodiments, the participants' display portions may be displayed in the order in which they entered the online video group discussion. Although, five participant display portions are shown in this particular example it should be noted that any number may be displayed without departing from the scope of the present disclosure.

In some embodiments, each participant display portion may have participant identification information associated therewith. For example, participant display portion 402 may have identification information 412 rendered, in this case identifying the participant as Chris ABC. Similarly, participant display portions 404, 406, 408, and 410 may each include corresponding identification information 414, 416, 418, and 420. As shown in FIG. 4, the identification information may include at least one of a participant's name and/or a link to a webpage associated with a participant (e.g., "Go to Profile"). Some or all of the identification information may or may not be accessible to the various participants of online video group discussion.

Assume for the purposes of this example, that user "Pete JKL" associated with participant display portion 408 has entered the online video group discussion and does not know where or how to begin his conversation with the other participants. Accordingly, discussion topic suggestion process 10 may be used to create a list of potential topics for discussion. In some embodiments, discussion topic suggestion process 10 may source information from a participant's profile as well as from various interactions on public posts. An individual participant may be provided with an option to opt out of sharing some or all of this information using any number of techniques, including but not limited to, adjusting his/her account settings, manually closing the display, etc.

In operation, once Pete JKL has entered the online video group discussion he may wish to start a conversation with one of the participants, for example, Chris ABC. In this way, Pete may indicate that he would like to know more about Chris using any number of techniques known in the art. For example, Pete may use pointer 422, e.g. by right-clicking or any other suitable technique, to select participant display portion 402 associated with Chris ABC. Discussion topic suggestion process 10 may then receive this indication of interest (e.g. at server computing device 12) and identify the participant as Chris ABC. Once the participant has been identified, discussion topic suggestion process 10 may be configured to determine one or more interests of Chris ABC based upon publicly available data and/or data that the participant has authorized for sharing. Discussion topic suggestion process 10 may then generate interface instructions based at least in part on the one or more interests of the first participant, in this particular example, Chris ABC. In some embodiments, the interface instructions may be transmitted to Pete JKL' computing device and may be usable to generate user interface 424, which may display the interests of Chris ABC. In some embodiments, user interface 424 may include the top ten interests of the particular user, however, any number of interests may be displayed. Additionally and/or alternatively, in some embodiments, certain interests may be highlighted within the user interface, e.g., Boston Red Sox, shown in user interface 424. The topic to be highlighted may be set by a participant. For example, Chris ABC could choose to highlight the interest "Boston Red Sox" if he was particularly interested in discussing that topic with the other members of the online video group discussion.

In some embodiments, discussion topic suggestion process 10 may determine one or more interests of a participant by searching for the data on a social networking page associated with the participant. Some social networking pages may include, but are not limited to FACEBOOK™, MYSPACE™, LINKEDIN™, TWITTER™, GOOGLE+, etc.

In some embodiments, the interests displayed in user interface 424 may be displayed in a particular order. For example, the interests may be configured for display in a ranked order. In this particular example, the ranked order may be based upon a similarity metric between the first participant and the second participant (e.g. Pete JKL and Chris ABC). In this way, if discussion topic suggestion process 10 determines that Pete and Chris are both interested in the Boston Red Sox but have no other common interests, then the "Boston Red Sox" interest may be displayed first.

As used herein the phrase "similarity metric" may refer to its ordinary meaning as well as to an indication of how many similar interests a participant may have with another participant or number of participants as compared with the general population.

As used herein the phrase "interests-similarity metric" may refer to its ordinary meaning as well as to an indication of how many similar interests a participant may have with another participant or number of participants as compared with a subset of the general population (e.g. within a user's circle or circles).

As shown in FIG. 4, one or more of the participants may be permitted to close user interface 424. This may be achieved using any number of suitable techniques known in the art, for example, by selecting the close button associated with user interface 424, etc.

As discussed above, in some embodiments the data used to populate user interface 424 may include data available to one or more of the participants. Additionally and/or alternatively, the data may include publicly available data or specific data made available by an individual participant. For example, in some embodiments, data could be sourced from a user's individual social networking profile.

In some embodiments, a profile may refer to a representation of an individual or a group of individuals on a member network (e.g. a GOOGLE+ profile). A profile may generally include details such as a name, a hometown, interests, pictures, and other information characterizing an individual or a group of individuals. A profile may be public if other network members (or even the general public) do not require the consent of the represented individual or group in order to access the profile. In this way, it should be noted that any or all of the participants of the online video group discussion may, at their own choosing, opt out of sharing access to their profile and/or identification information to other participants.

In some embodiments, the other participants (e.g., Jim DEF, Bob GHI, Chris ABC, and John MNO) may be restricted from viewing and/or accessing the identification information of Pete JKL until he has enabled the sharing of this information himself. For example, the hyperlink associated with each user's webpage may be disabled and/or enabled based upon the settings decided upon by that particular user.

Figure 5:
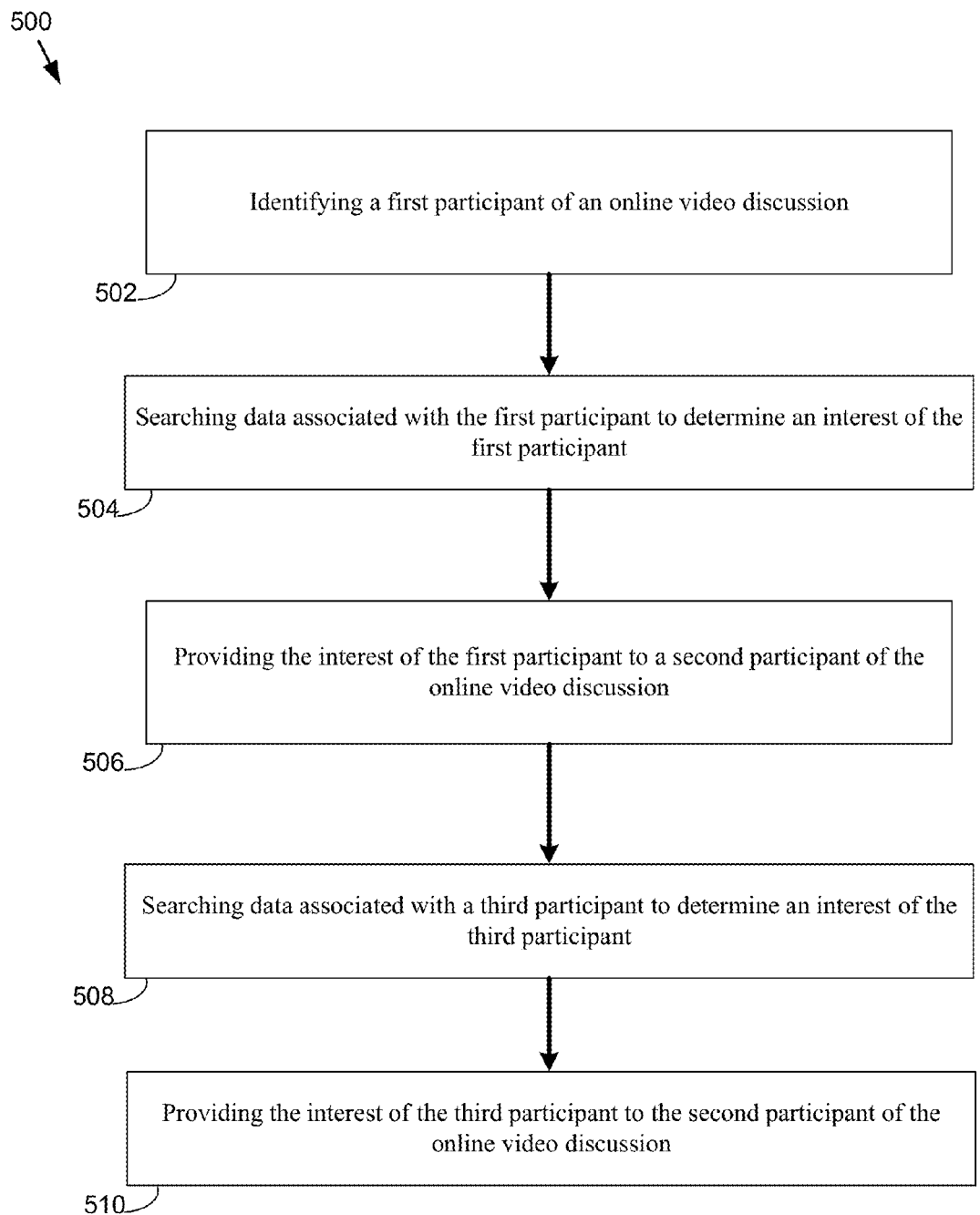
FIG. 5 is a flowchart of an additional method for suggesting discussion topics in accordance with an embodiment of the present disclosure.

Referring now to FIG. 5, one embodiment of a discussion topic suggestion process 500 is provided. Discussion topic suggestion process 500 may include identifying (502), using the one or more computing devices, a first participant of an online video discussion. Discussion topic suggestion process 500 may further include searching (504), using the one or more computing devices, data associated with the first participant to determine an interest of the first participant. Process 500 may also include providing (506), using the one or more computing devices, the interest of the first participant to a second participant of the online video discussion. Process 500 may further include searching (508), using the one or more computing devices, data associated with a third participant to determine an interest of the third participant and providing (510), using the one or more computing devices, the interest of the third participant to the second participant of the online video discussion.

In operation, the embodiment described above in FIG. 5 may allow for a participant to view the interests of multiple participants of the online video discussion. For example, Pete JKL may be provided with the interests of Jim DEF and Chris ABC. In this way, discussion topic suggestion process 10 may be configured to determine the most relevant interests of all of the participants of the online video discussion and may also determine the interests based upon a similarity metric between all of the participants. Additionally and/or alternatively, discussion topic suggestion process 10 may be configured to provide the most relevant interests of all of the participants of the online video discussion and may also provide the interests based upon a similarity metric between all of the participants. In this way, the most relevant discussion topics, taking into account all of the participants' interests may be provided. These interests may be provided in a ranked format as described above. Accordingly, discussion topic suggestion process 10 may provide a suggested interest of discussion to one or more of the participants.

In some embodiments, discussion topic suggestion process 10 may be configured to allow any of the participants to remove an undesired interest from a displayed interests list. For example, and referring again to FIG. 4, if Chris ABC did not want to display his interest in the Boston Red Sox, he could remove that interest and prevent its display from user interface 424.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

The invention claimed is:

1. A computer-implemented method for execution on one or more computing devices, the method comprising:
    identifying, using the one or more computing devices, a first participant associated with an online group discussion;
    determining, using the one or more computing devices, a first interest of the first participant of the online group discussion based upon, at least in part, data associated with the first participant;
    identifying, using the one or more computing devices, a second participant associated with the online group discussion;
    determining, using the one or more computing devices, a second interest of the second participant of the online group discussion based upon, at least in part, data associated with the second participant;
    identifying, using the one or more computing devices, a third participant associated with the online group discussion;
    determining, using the one or more computing devices, a third interest of the third participant of the online group discussion based upon, at least in part, data associated with the third participant;
    determining, using the one or more computing devices, a first ranked set of the first interest of the first participant and the second interest of the second participant based on application of a first similarity metric that measures similarity between the first interest and the third interest and similarity between the second interest and the third interest;
    generating interface instructions based at least in part on the first ranked set of the first interest of the first participant and the second interest of the second participant, using the one or more computing devices, the interface instructions usable to generate a user interface of the first ranked set for the third participant associated with the online group discussion;
    providing, using the one or more computing devices, the interface instructions to a third participant computing device associated with the third participant;
    determining, using the one or more computing devices, a second ranked set of the first interest of the first participant and the third interest of the third participant based on application of a second similarity metric that measures similarity between the first interest and the second interest and similarity between the third interest and the second interest; and
    providing, using the one or more computing devices, the second ranked set to the second participant of the online group discussion.

2. The computer-implemented method of claim 1, further comprising:
    searching for interactions between the first participant and one or more other users on a social network;
    wherein the interactions are stored as the data associated with the first participant.

3. The computer-implemented method of claim 1, wherein the similarity between the first interest and the third interest further includes a comparison of a first number of interests shared by the first participant and the third participant as compared to a second number of interests shared by the first participant and a fourth participant that is part of a general population of participants and not part of the online group discussion.

4. The computer-implemented method of claim 1, further comprising:
    receiving an indication of a selection of the first interest from the third participant; and
    initiating the online group discussion on the first interest.

5. The computer-implemented method of claim 1, wherein the online group discussion includes an Internet-enabled video chat.

6. The computer-implemented method of claim 1, further comprising:
    receiving a request from the third participant to remove the first interest from the first ranked set; and
    responsive to receiving the request, removing the first interest from the first ranked set.

7. The computer-implemented method of claim 1, further comprising:
    receiving a request from the first participant to highlight the first interest; and
    wherein generating interface instructions further comprises generating instructions to highlight the first interest.

8. The computer-implemented method of claim 1, wherein determining the third interest occurs responsive to the third participant providing permission to share the third interest.

9. A computer program product residing on a non-transient computer readable storage medium having a plurality of instructions stored thereon, which when executed by a processor, cause the processor to perform operations comprising:
    identifying a first participant associated with an online group discussion;
    determining a first interest of the first participant of the online group discussion based upon, at least in part, data associated with the first participant;

identifying a second participant associated with the online group discussion;

determining a second interest of the second participant of the online group discussion based upon, at least in part, data associated with the second participant;

identifying a third participant associated with the online group discussion;

determining a third interest of the third participant of the online group discussion based upon, at least in part, data associated with the third participant;

determining a first ranked set of the first interest of the first participant and the second interest of the second participant based on application of a first similarity metric that measures similarity between the first interest and the third interest and similarity between the second interest and the third interest;

generating interface instructions based at least in part on the first ranked set of the first interest of the first participant and the second interest of the second participant, the interface instructions usable to generate a user interface of the first ranked set for the third participant associated with the online group discussion;

providing the interface instructions to a computing device associated with the third participant;

determining, using the one or more computing devices, a second ranked set of the first interest of the first participant and the third interest of the third participant based on application of a second similarity metric that measures similarity between the first interest and the second interest and similarity between the third interest and the second interest; and providing, using the one or more computing devices, the second ranked set to the second participant of the online group discussion.

10. The computer program product of claim 9, wherein the operations further comprise:

searching for the data associated with the first participant on a social networking page associated with the first participant.

11. The computer program product of claim 9, wherein common interests are assigned a higher ranking in the first ranked set based on the similarity metric.

12. The computer program product of claim 9, wherein the operations further comprise:

receiving an indication of a selection of the first interest from the third participant; and initiating the online group discussion on the first interest.

13. The computer program product of claim 9, wherein the online group discussion includes an Internet-enabled video chat.

14. The computer program product of claim 9, wherein the operations further comprise:

permitting the second participant to close a portion of the user interface.

15. The computer program product of claim 9, wherein the operations further include highlighting the first interest.

16. The computer program product of claim 9, wherein the user interface includes a selectable link to a profile associated with the first participant responsive to the first participant providing permission to enable sharing of information about the first participant.

17. A computing system comprising:

one or more processors; and a memory containing software instructions that, when executed by the one or more processors, cause the one or more processors to perform operations including:

identifying a first participant associated with an online group discussion, determining a first interest of the first participant of the online group discussion based upon, at least in part, data associated with the first participant, identifying a second participant associated with the online group discussion, determining a second interest of the second participant of the online group discussed based upon, at least in part, data associated with the online group discussion, identifying a third participant associated with the online group discussion, determining a third interest of the third participant of the online group discussion based upon, at least in part, data associated with the third participant, determining a first ranked set of the first interest of the first participant and the second interest of the second participant based on application of a first similarity metric that measures similarity between the first interest and the third interest and similarity between the second interest and the third interest, generating interface instructions based at least in part on the first ranked set of the first interest of the first participant and the second interest of the second participant, the interface instructions usable to generate a user interface of the first ranked set of the first interest of the first participant and the second interest of the second participant for the third participant associated with the online group discussion, providing the interface instructions to a computing device associated with the third participant, determining, using the one or more computing devices, a second ranked set of the first interest of the first participant and the third interest of the third participant based on application of a second similarity metric that measures similarity between the first interest and the second interest and similarity between the third interest and the second interest, and providing, using the one or more computing devices, the second ranked set to the second participant of the online group discussion.

18. The computing system of claim 17, wherein the operations further comprise:

searching for interactions between the first participant and one or more other users on a social network;

wherein the interactions are stored as the data associated with the first participant.

19. The computing system of claim 17, wherein the similarity between the first interest and the third interest further includes a comparison of a first number of interests shared by the first participant and the third participant as compared to a second number of interests shared by the first participant and a fourth participant that is part of a general population of participants and not part of the online group discussion.

20. The computing system of claim 17, wherein the operations further comprise:

receiving an indication of a selection of the first interest from the third participant; and initiating the online group discussion on the first interest.

21. The computing system of claim 17, wherein the online group discussion includes an Internet-enabled video chat.

22. The computing system of claim 17, wherein the operations further comprise:

receiving a request from the third participant to remove the first interest from the first ranked set; and responsive to receiving the request, removing the first interest from the first ranked set.

23. The computing system of claim 17, wherein the operations further comprise:

receiving a request from the first participant to highlight the first interest; and wherein generating interface instructions further comprises generating instructions to highlight the first interest.

24. The computing system of claim 17, wherein determining the third interest occurs responsive to the third participant providing permission to share the third interest.

25. A computer-implemented method for execution on one or more computing devices, said method comprising:
- identifying, using the one or more computing devices, a first participant of an online video discussion;
- searching, using the one or more computing devices, data associated with the first participant to determine a first interest of the first participant;
- identifying, using the one or more computing devices, a second participant of the online video discussion;
- searching, using the one or more computing devices, data associated with the second participant to determine a second interest of the second participant;
- identifying, using the one or more computing devices, a third participant of the online video discussion;
- searching, using the one or more computing devices, data associated with the third participant to determine a third interest of the third participant;
- determining, using the one or more computing devices, a first ranked set of the first interest of the first participant and the second interest of the second participant based on application of an interests-similarity metric;
- providing, using the one or more computing devices, the first ranked set to the third participant of the online video discussion;
- determining, using the one or more computing devices, a second ranked set of the first interest of the first participant and the third interest of the third participant based on application of the interests-similarity metric; and
- providing, using the one or more computing devices, the second ranked set to the second participant of the online video discussion.

26. The computer-implemented method of claim 25, further comprising:
- allowing at least one of the first participant, the second participant, and the third participant to remove an undesired interest from a displayed interests list.

27. The computer-implemented method of claim 25, wherein the interests-similarity metric is an indication of how many similar interests are shared between at least two of the first participant, the second participant, and the third participant.

28. The computer-implemented method of claim 27, further comprising:
- searching for interactions between the first participant and one or more other users on a social network; and
- wherein the interactions are stored as the data associated with the first participant.

* * * * *